(No Model.)
E. DELANY.
INSECT DESTROYER.
No. 309,774. Patented Dec. 23, 1884.
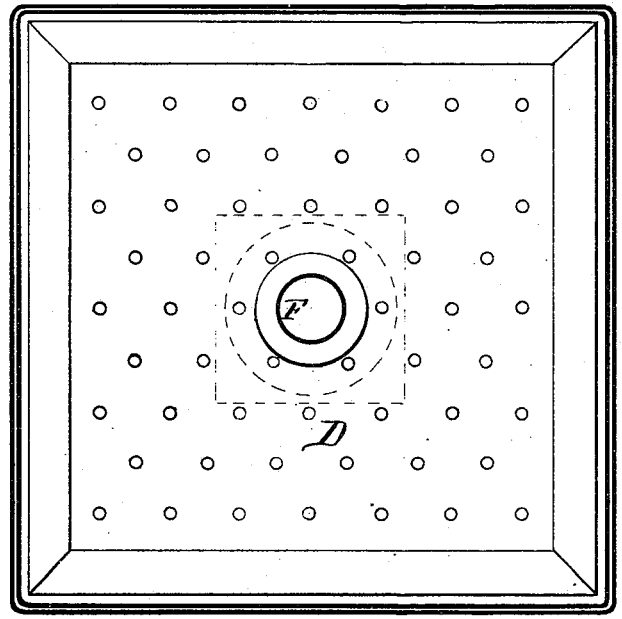
Fig.1
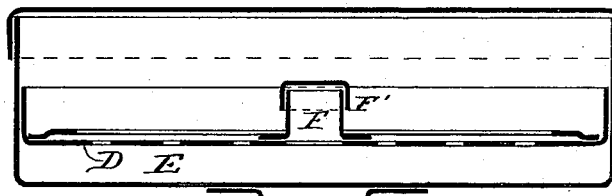
Fig.2
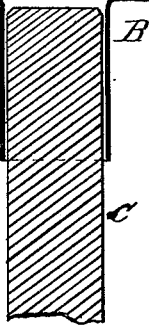
Witnesses:
W. Chaffie
J. P. Town
Inventor
By Elmer Delany
Connolly Bro
Attorneys.

UNITED STATES PATENT OFFICE.

ELMER DELANY, OF NEWARK, NEW JERSEY.

INSECT-DESTROYER.

SPECIFICATION forming part of Letters Patent No. 309,774, dated December 23, 1884.

Application filed April 11, 1884. (No model.)

*To all whom it may concern:*

Be it known that I, ELMER DELANY, a citizen of the United States, residing at Newark, in the county of Essex and State of New Jersey, have invented certain new and useful Improvements in Insect-Destroyers; and I do hereby declare the following to be a full, clear, and exact description of the invention, reference being had to the accompanying drawings, which form part of this specification, in which—

Figure 1 is a plan view, and Fig. 2 a vertical central section, of my invention.

This invention has relation to insect-destroyers; and it consists in the novel construction of a fumigating device, the essential elements of which are a shallow pan provided with a perforated diaphragm and adapted to contain volatile oil or other fluid for suffocating mosquitoes or other insects, and a suitable staff or handle upon which the pan is supported and by means of which the fumes or vapors may be brought to bear upon insects on the ceiling or walls of a room.

Referring to the drawings, A designates a shallow pan or dish having on its under side a ferrule or socket, B, for the reception of a handle or staff, C, which being inserted therein enables the pan to be raised close to a ceiling or other high surface upon which mosquitoes or other insects rest. The pan A may be made of any material; but sheet metal, tinned, is preferable, as being comparatively inexpensive.

D designates a perforated sheet-metal diaphragm fitted within the pan or dish a short distance above the bottom, leaving a shallow space, E, to contain any suitable fluid the vapors of which will destroy insects by suffocation. If desired, a piece of sponge, felt, bibulous paper, or other absorbent medium may be laid in the space E, to take up the fluid and prevent loss by spilling or otherwise.

F designates a nozzle through which the space E is supplied, and F' designates a cap fitting said nozzle to close the same.

The diaphragm D may be attached rigidly and permanently by soldering or otherwise to the pan or dish, or it may be detachable.

Having described my invention, I claim—

The insect-destroyer comprising the pan or dish A, with the perforated diaphragm or screen D, provided with the nozzle F, socket B, and handle or staff C, substantially as described.

In testimony that I claim the foregoing I have hereunto set my hand this 5th day of April, 1884.

ELMER DELANY.

Witnesses:
A. A. CONNOLLY,
C. E. NYLANDER.